UNITED STATES PATENT OFFICE.

SAMUEL S. GARRIGUES, OF ANN ARBOR, MICHIGAN.

WASHING AND PURIFYING SALT.

SPECIFICATION forming part of Letters Patent No. 299,774, dated June 3, 1884.

Application filed January 30, 1884. (No specimens.)

*To all whom it may concern:*

Be it known that I, SAMUEL S. GARRIGUES, of Ann Arbor, in the county of Washtenaw and State of Michigan, have invented certain new and useful Improvements in Washing and Purifying Salt, of which the following is a full, clear, and exact description.

This invention, which constitutes a new method or process of washing and purifying salt, consists in washing the salt—common fine salt, for instance—while in the storage bins or other suitable receptacles, with a pure and neutral solution of salt, substantially as hereinafter described, and which has the effect of dissolving and carrying off the soluble chlorides of calcium and magnesium in the salt under treatment.

In carrying out my improved process I first make a pure solution of salt by dissolving pure salt in water until the solution reaches saturation, which result is obtained by using about one part, by weight, of pure salt and three parts, by weight, of water. This pure solution is then allowed to slowly percolate through the salt in the storage-bins to be washed and purified, care being taken to provide for the draining of the solution from the bins after washing the salt. The proportion of this pure solution used in thus washing the salt may be about five gallons to each and every barrel of salt to be washed. Sufficient time should be allowed for drainage of the salt after washing, and for this purpose from three to five days will ordinarily answer; but this will largely depend upon the temperature and condition of the atmosphere at the time.

If desired, and in cold weather it will be found advisable, the pure washing solution may be used in a heated state, for the purpose of facilitating the solution of the chlorides, and I reserve to myself the right of using it either in a cold or heated condition. The efficacy of the process is based upon the extreme solubility of the earthy chlorides of calcium and magnesium in a saturated solution of pure salt.

I am aware that salt has heretofore been purified by passing through it, while in bins having perforated false bottoms, a saturated solution of salt previously purified in about the proportion of twenty gallons of purified solution of salt to a barrel. This process requires, in consequence of the large amount of solution employed, the necessity of constructing large salt-houses provided with bins with double bottoms, to allow for drainage, and also the saving of the brine after its work as a purifier is performed. In my process no expensive salt-works provided with bins having false bottoms are required, the salt being purified in the storage-bins themselves, without the necessity of handling it, and the amount of brine used being so small—viz., four gallons only to the barrel, or one-fifth less than that of the patent disclaimed—there is no necessity of saving the solution. My process, therefore, is much cheaper and more readily accomplished, and with less labor, than that of the patent disclaimed.

Having thus described my invention, what I claim as new, and desire to secure by Letters Patent, is—

The process herein described of washing and purifying salt, which consists in first placing the salt in storage-bins having perforated bottoms, then preparing a pure solution of salt in the proportion of one of salt to three of water, then allowing said solution in the proportion of four gallons of the solution to a barrel of salt to slowly percolate through the salt in the bins to be washed, the solution passing through the perforated bottoms of the bins, as set forth.

SAMUEL S. GARRIGUES.

Witnesses:
ADÉLE M. GARRIGUES,
WILLIAM D. HARRIMAN.